(12) United States Patent
Grosscup

(10) Patent No.: US 11,917,990 B2
(45) Date of Patent: Mar. 5, 2024

(54) PEST DETERRENT DEVICE

(71) Applicant: Andrew Grosscup, Chicago, IL (US)

(72) Inventor: Andrew Grosscup, Chicago, IL (US)

(*) Notice: Subject to any disclaimer, the term of this patent is extended or adjusted under 35 U.S.C. 154(b) by 437 days.

(21) Appl. No.: 17/182,001

(22) Filed: Feb. 22, 2021

(65) Prior Publication Data

US 2022/0264869 A1    Aug. 25, 2022

(51) Int. Cl.
*A01M 29/22* (2011.01)
*A01M 29/18* (2011.01)
*G01J 5/02* (2022.01)
*G01J 5/48* (2022.01)

(52) U.S. Cl.
CPC ............ *A01M 29/22* (2013.01); *A01M 29/18* (2013.01); *G01J 5/027* (2013.01); *G01J 5/485* (2022.01)

(58) Field of Classification Search
CPC ...... A01M 29/22; A01M 29/18; A01M 29/00; A01M 29/16
USPC .......................................... 367/139; 116/22 A
See application file for complete search history.

(56) References Cited

U.S. PATENT DOCUMENTS

| 4,658,386 A * | 4/1987 | Morris ................... A01M 29/18 340/573.2 |
| 5,713,666 A * | 2/1998 | Seelin ................... G01J 5/0003 374/126 |
| 5,892,446 A | 4/1999 | Reich |
| 5,966,075 A | 10/1999 | Blanks |
| 6,016,100 A * | 1/2000 | Boyd ................... A01M 31/002 340/573.2 |
| 6,700,486 B1 | 3/2004 | Banki |
| 2011/0176391 A1* | 7/2011 | DeLaCroix ........... A01M 29/16 367/139 |
| 2014/0123543 A1 | 5/2014 | Osseiran |

FOREIGN PATENT DOCUMENTS

| GB | 2254464 A * | 10/1992 | ............ A01M 29/16 |
| GB | 2255217 A * | 10/1992 | ............ A01M 29/16 |

* cited by examiner

*Primary Examiner* — Ian J Lobo
(74) *Attorney, Agent, or Firm* — Foley & Lardner LLP

(57) ABSTRACT

A pest deterrent system is provided. The pest deterrent system includes a sensor module and an actuator module. The sensor module includes a first housing, a sensor, and a controller. The sensor is positioned within the first housing and proximate to the view window such that the sensor is in visual communication with the view window and configured to detect objects outside of the first housing. The controller is positioned within the first housing and is operatively coupled to the sensor. The controller is configured to receive a signal from the sensor, such as an alert that an object is near the sensor module. The actuator module includes a second housing separate from the first housing, an actuator, and a second controller. The second controller configured to receive a signal from the first controller to actuate the actuator in response to the sensor being triggered.

20 Claims, 7 Drawing Sheets

PEST DETERRENT DEVICE

BACKGROUND

The present disclosure relates generally to pest deterrent systems for a garden.

SUMMARY

An assembly includes a sensor module and an actuator module separated from the sensor module. The sensor module includes a first housing having a view window positioned in a sidewall of the first housing. A sensor is positioned within the first housing and proximate to the view window such that the sensor is in visual communication with the view window and configured to face out of the first housing. The sensor module further includes a controller positioned within the first housing and operatively coupled to the sensor such that the controller is configured to receive a signal from the sensor. The actuator module includes a second housing separate from the first housing of the sensor module. Positioned within the second housing is an actuator and a second controller. The second controller is configured to a second controller configured to receive a signal from the first controller and actuate the actuator.

A system includes a control hub and a peripheral module. The control hub includes a first housing defining a first housing cavity and a sensor positioned within the first housing cavity. The sensor is configured to detect the presence of an animal and in response to detecting the presence of the animal, transmit a detection signal. A first controller is communicably coupled to the sensor and is configured to receive the detection signal from the sensor in response to receiving the detection signal, transmit a deterrent request. The peripheral module is in communication with the control hub and includes a second housing, an actuator, and a second controller. The second housing separate from the first housing and defines a second housing cavity. The actuator is positioned within the second housing and the second controller is in communication with the first controller. The second controller is configured to receive the deterrent request from the first controller and in response to the receiving the deterrent request, transmit a deterrent commend to the actuator so as to cause the actuator to actuate.

A method includes detecting, by a sensor module, the presence of an animal; transmitting, by the sensor module to an actuator module, a detection signal in response to the detecting the presence of the animal; receiving, by the actuator module from the sensor module, the detection signal; transmitting, by the actuator module to an actuator, a deterrent command in response to receiving the detection signal so as to actuate the actuator.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
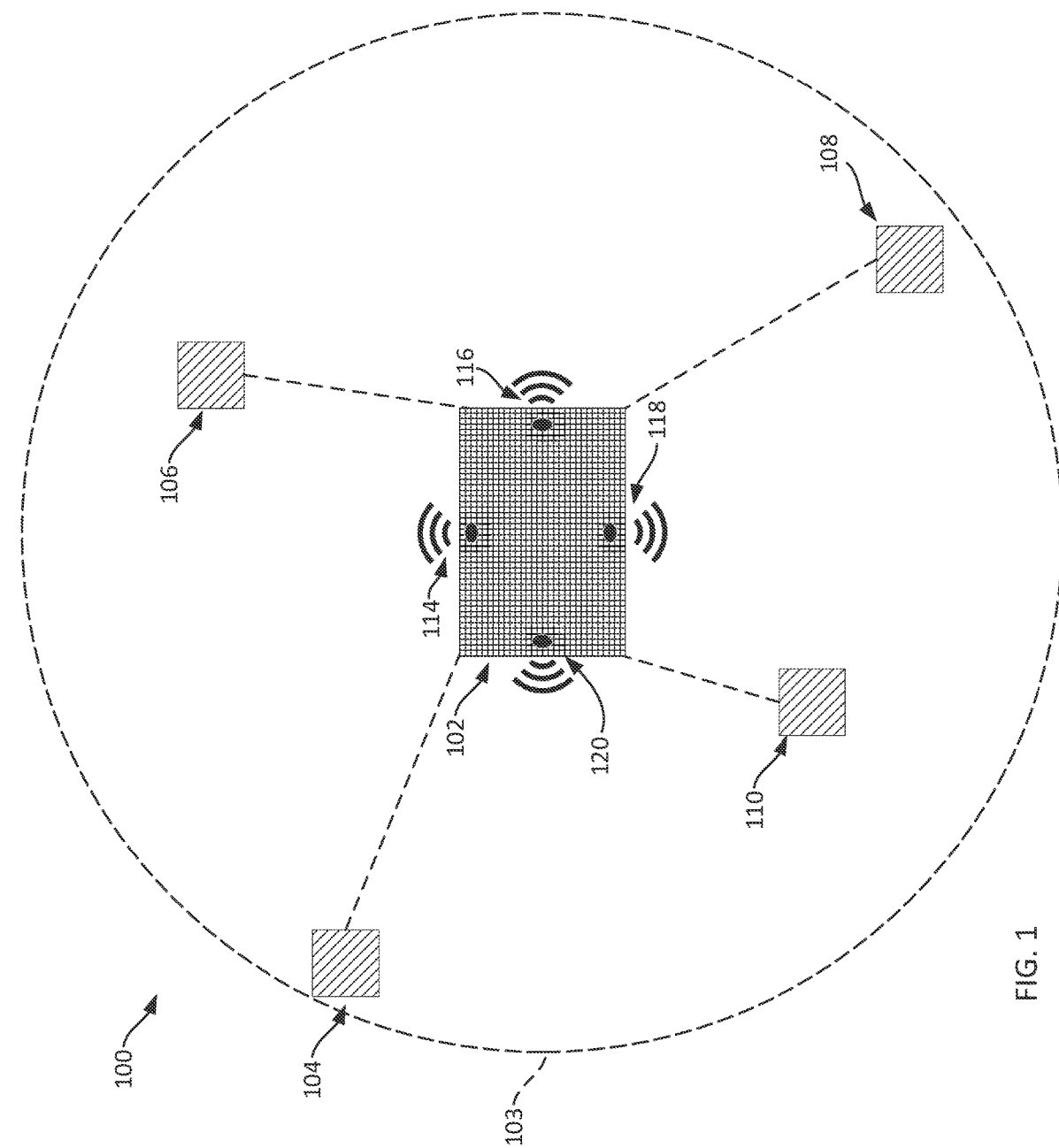
FIG. 1 is a top view of a pest deterrent system, according to an example embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Pests, such as squirrels, rabbits, and rats, can cause damage to a person's garden. Since the beginning of agriculture, man has been trying to create new ways to keep pests away from their crop. Nowadays, gardens can be found in almost every corner of the world, including urban areas. While there are many tried and true methods for keeping critters out of a garden, such as building a fence or wall, many gardeners do not have the resources or the space for such a system. Further, these types of systems can be difficult to move should the urban gardener ever move.

A pest deterrent system is provided that is easy to use, easy to install, and easy to move from garden to garden. The pest deterrent system is also scalable to meet the needs of gardens great and small. The pest deterrent system is also quiet and inconspicuous such that it can be used in a patch of decorative flowers without being an eyesore.

Some pest deterrent systems are "all-in-one" devices, where a unit detects a pest, and the same unit provides a stimulus, such as a noise or spinning arms, that scares the pest away. However, it is possible for pests to learn to avoid the unit. Pests may begin to avoid the unit and the area of the garden that the unit is positioned within, but the pests may than spend more time in other areas of the garden not protected by the unit. The pest deterrent system of the present application includes a sensor module and an actuator module that are separate from one another. The sensor module includes a sensor that detects the presence of a pest, and the actuator module provides the stimulus that scares the pest away. If the sensor module is separated from the actuator module, the pest is unable to learn the location of the actuator module. For example, when the pest gets close to the sensor module, the actuator module may provide a stimulus at a different location, such as three feet away. Then when the pest goes to investigate where the stimulus came from, the pest will be unable to find it because the actuator module will not be triggered again. Thus, the pest is unable to learn to avoid certain parts of the garden since the stimulus is separate from the sensor.

Positioning the actuator module separate from the sensor module also provides the advantage of avoiding infinite loops, such as by the stimulus provided by the actuator module triggering the sensor module, which triggers the actuator module again. All-in-one deterrent devices run the risk of triggering themselves and creating an infinite loop.

The pest deterrent system is also configured to detect a direction the pest is travelling and actuate an actuator module or a plurality of actuator modules depending on which direction the pest is traveling. For example, multiple sensors may be triggered in a particular order that may indicate to the sensor module that the pest is travelling in a particular direction (e.g., left-to-right, right-to-left, clockwise, counterclockwise, back-and-forth, etc.). Accordingly, based on a determined direction of the pest, the sensor module may be configured to trigger a specific actuator. For example, the sensor module may actuate an actuator module that the pest is running in a direction toward. When the pest changes directions based on the perceived threat straight ahead, the new determined direction of the pest may cause the sensor module to trigger another actuator in the direction of the new determined direction of the pest. As this continues, the pest may be confused and/or so scared that the pest avoids the garden entirely in the future. Similarly, the sensor module may actuate actuator modules that are positioned in a direction substantially opposite to the direction of the pest in an effort to confuse the pest.

The pest deterrent system includes a sensor module and a plurality of actuator modules. The sensor module includes sensors, such as proximity sensors, and is configured to detect the presence of a pest in a garden. The sensor module may be integrated into common items found in a garden so as to be inconspicuous, such as a stone, lamp, stick, or garden gnome. When the sensor module detects the presence of a pest, the sensor module triggers one of the plurality of actuator modules to actuate. Such actuation by the actuator module may include emitting vibrations, smells, sounds, projectiles, and the like. In urban environments, neighbors can be easily annoyed, even on a good day. Thus, there is a desire for a quite device that can deter pests. Also common in urban environments are children and pets, either those belonging to the gardener, passers-by, or the easily-annoyed neighbor. Thus, there is a desired for a pest deterrent that does not cause harm to pets and children, such as a kill trap or poison. Kills traps require consistent monitoring to ensure that the trap is still set and did not capture a pest. Further, kill traps require the disposal of dead animals, which is avoided with the use of the pest deterrent system of the present disclosure.

FIG. 1 is a top view of a pest deterrent system 100, according to an example embodiment. The pest deterrent system 100 includes a sensor module 102 operatively coupled to each of a first actuator module 104, a second actuator module 106, a third actuator module 108, and a fourth actuator module 110. In some embodiments, the pest deterrent system 100 includes more or fewer actuator modules and is not limited to the four actuator modules shown.

The sensor module 102 further includes a first sensor 114, a second sensor 116, a third sensor 118, and a fourth sensor 120. The first sensor 114 may be an infrared sensor, an ultrasonic sensor, a position sensor, a proximity sensor, an occupancy sensor, a motion sensor, or a similar sensor. The first sensor 114 is configured to detect the presence of an object, such as an animal. In some embodiments, the first sensor 114 is an infrared camera and is configured to detect the heat emitted from a warm-blooded animal, such as a squirrel or rabbit. In some embodiments, the first sensor 114 is a video camera. In some embodiments, the first sensor 114 is a passive infrared occupancy sensor configured to detect the radiant heat from a warm body, such as a human or pest. In some embodiments, the second, third and fourth sensors 116, 118, 120 are structured similarly to the first sensor 114. In other embodiments, the second, third and fourth sensors 116, 118, 120 are structured differently than the first sensor 114.

The sensor module 102 is configured to send a signal to one or more of the actuator modules at a given time to cause the actuator module to actuate. For example, the sensor module 102 may send a signal to the first actuator module 104, causing the first actuator module 104 to vibrate and make noise. In some embodiments, the sensor module 102 may cause more than one of the plurality of actuator modules 104, 106, 108, 110 to actuate.

The plurality of actuator modules 104, 106, 108, 110 are operatively coupled to the sensor module 102 using wires. In some embodiments, the plurality of actuator modules 104, 106, 108, 110 are wireless and may communicate wirelessly with the sensor module 102.

Each of the plurality of actuator modules 104, 106, 108, and 110 is separate from the sensor module 102. For example, the first actuator module 104 is separate from the sensor module 102 such that the first actuator module 104 may be positioned without influencing the position of the sensor module 102. In some embodiments, the sensor module 102 defines an operation radius 103 within which the actuator modules 104, 106, 108, and 110 may be positioned. In some embodiments, the sensor module 102 communicates wirelessly with all the plurality of actuator modules 104, 106, 108, and 110 positioned within the operation radius 103. The operation radius 103 is the result of a plurality of variables, including, but not limited to, the type of wireless communication signal and power availability. In some embodiments, the operation radius 103 is defined by the wires that connect each of the plurality of actuator modules 104, 106, 108, and 110 to the sensor module 102. In some embodiments, the sensor module 102 does not communicate with any of the plurality of actuator modules 104, 106, 108, and 110 positioned outside of the operation radius 103. In some embodiments, the first actuator module 104 may be placed at any position within the operation radius 103 and receive a signal from the sensor module 102 at any position within the operation radius 103. In some embodiments, the operation radius 103 is greater than 6 inches. In some embodiments, the operation radius 103 is approximately 36 inches. In some embodiments, the sensor module 102 is configured to detect that the first actuator module 104 is positioned outside of the operation radius 103 and is configured to selectively prevent sending signals to the first actuator module 104 when the first actuator module 104 is positioned outside of the operation radius 103.

Figure 2:
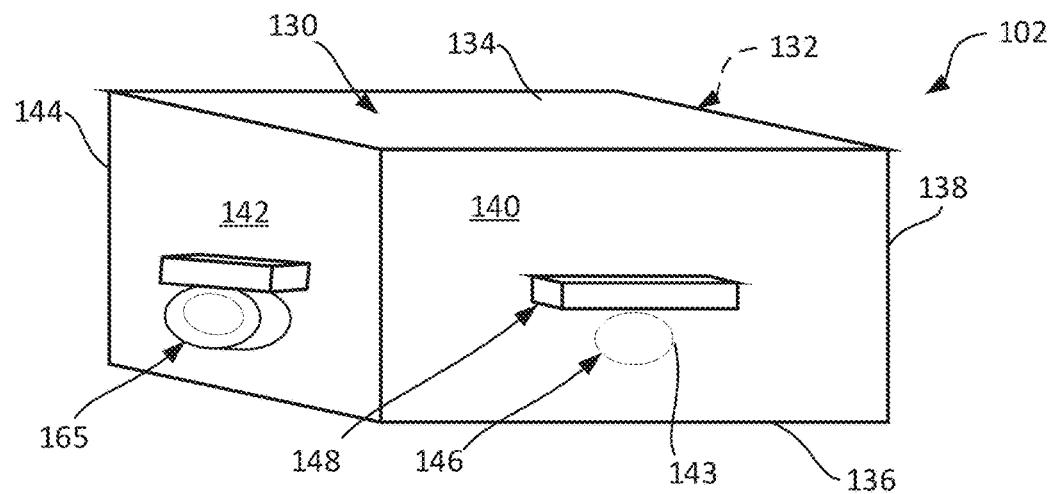
FIG. 2 is a perspective view of a sensor module of the pest deterrent device of FIGS. 1 and 2.

FIG. 2 is a perspective view of the sensor module 102, according to an example embodiment. The sensor module 102 includes a housing 130 defining a housing cavity 132. The housing 130 has a substantially rectangular shape and includes a top wall 134, a bottom wall 136, a first sidewall 138, a second sidewall 140, a third sidewall 142, and a fourth sidewall 144. In some embodiments, the top wall 134 is a lid and is configured to be removably and sealingly coupled to the housing 130 such that the housing cavity 132 may be accessed for making repairs and for general maintenance. The housing 130 is configured for being outside for extended periods of time (e.g., weeks, months, years) and may be weatherproof and/or waterproof. The housing 130 is formed of a non-corrosive material, such as plastic, stainless steel, aluminum, and similar materials. While the housing 130 is shown as having a substantially rectangular shape, the shape of the housing 130 my take many different shapes, such as spherical and cylindrical. In some embodiments, the housing 130 is a garden decoration, such as a gnome or lamp.

An opening 143 defining a view window 146 extends through a sidewall of the housing 130, such as the second sidewall 140 shown in FIG. 2, and allows the second sensor 116 to be positioned within the housing 130 while also detecting the surrounding environment outside of the housing 130. The view window 146 may include glass or other transparent material such that the second sensor 116 may be uninhibited by the view window 146. In some embodiments, the second sensor 116 includes the view window 146, such as a sensor designed for outdoor or underwater use. Thus, the second sensor 116 is sealingly coupled within the opening 143 such that the second sensor 116 is in visual communication with the space outside of the housing 130. Each of the first sidewall 138, the third sidewall 142, and the fourth sidewall 144 may include a view window similar to the view window 146.

The housing 130 may further include a blinder 148 positioned proximate to the view window 146 and configured to limit the visual range of the second sensor 116. The blinder 148 may be removably coupled to the housing 130, such as with latches or magnets, such that the visual range of the second sensor 116 is limited. For example, the second sensor 116 may be falsely triggered by events that are not related to pests or are not a threat to the garden in which the sensor module 102 is positioned. For example, the movement of the tops of plants or the movement of passers-by may repeatedly trigger the second sensor 116, causing the actuator modules to use deplete their power more quickly. Thus, the blinder 148 may be coupled above the view window 146 to prevent such events from triggering the second sensor 116. The blinder 148 may also be coupled to the sides of the view window 146 to prevent peripheral events from triggering the second sensor 116, such as foot traffic on a sidewalk, lawn, patio, and the like. While the blinder 148 is described with reference to the second sensor 116, it should be understood that the blinder 148 may be effectively positioned about the first sensor 114, the third sensor 118, and the fourth sensor 120.

The sensor module 102 further includes a lens 165 removably coupled over the third sensor 118. The lens 165 may control the view range of the third sensor 118, either lengthening, shortening, narrowing, widening, or shifting the view range. The lens 165 may be removably coupled to the sensor module 102 such that the lens 165 may be coupled over any one of the first sensor 114, the second sensor 116, the third sensor 118, and the fourth sensor 120.

Figure 3:
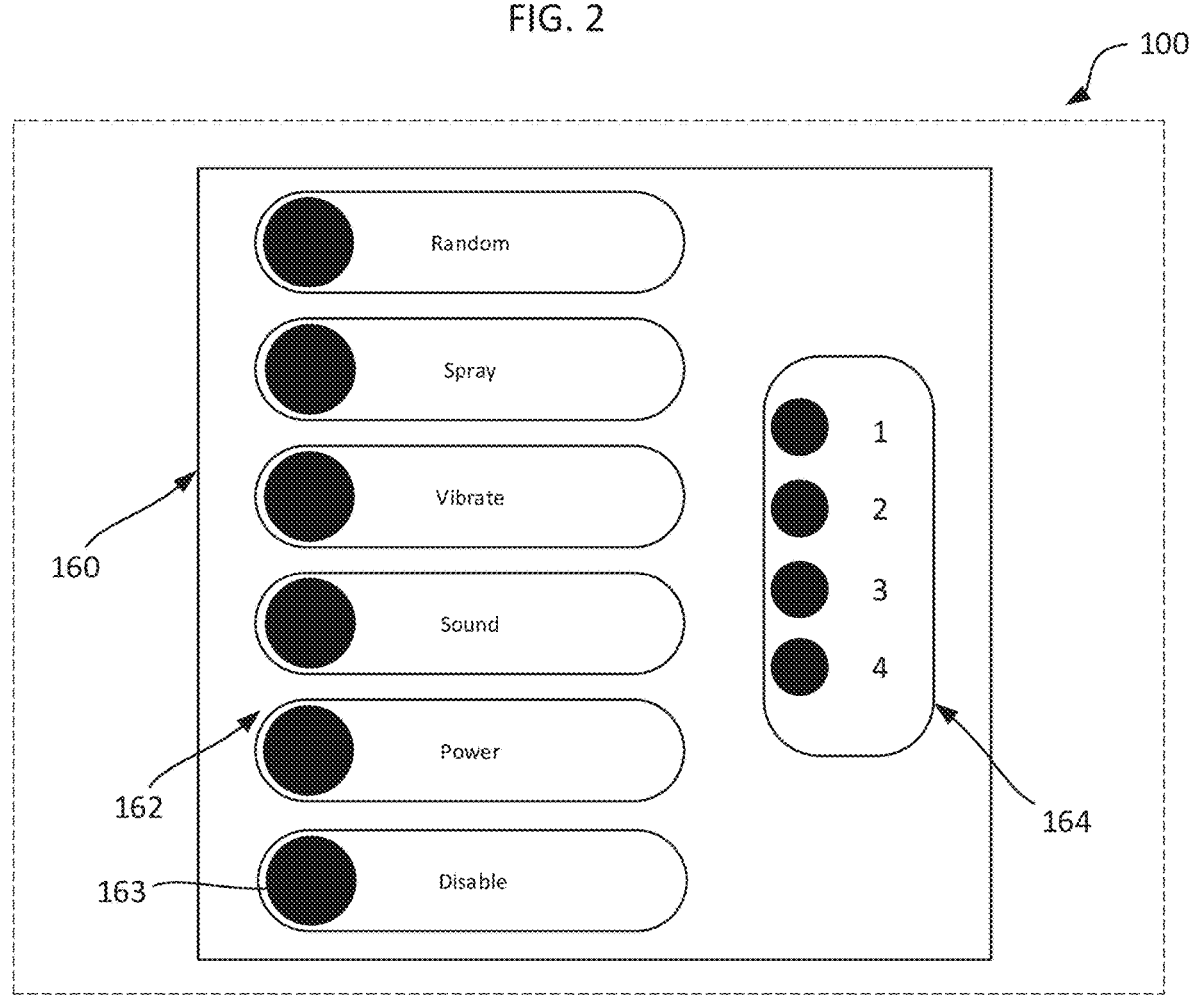
FIG. 3 is a top view of a portion of the sensor module of FIG. 2.

FIG. 3 is a top view of a control panel 160 of the sensor module 102, according to an example embodiment. The control panel 160 includes a first plurality of switches 162 and a second plurality of switches 164. Each of the first plurality of switches 162 and the second plurality of switches 164 may configure the actuator modules 104, 106, 108, 110 to behave differently in response to a triggering event. For example, in response to pressing the "1" button and the "sound" button, the first actuator module 104 may be configured to emit only sound. In response to pressing the "4" button and the "vibrate" button, the fourth actuator module 110 is configured to vibrate in response to a triggering event. In some embodiments, the first plurality of switches 162 includes a disable switch 163 configured to disable the pest deterrent system 100. For example, a user may disable the pest deterrent system 100 when the user is in the garden. The disable switch 163 may be an on/off switch, where a first actuation of the disable switch 163 disables the pest deterrent system 100, and a second actuation of the disable switch 163 enables the pest deterrent system 100. In some embodiments, the disable switch 163 temporarily disables the pest deterrent system 100 for a pre-determined amount of time. For example, when the disable switch 163 is actuated, the pest deterrent system 100 becomes inactive for an hour (e.g., two hours, a day, etc.). After the hour is over, the pest deterrent system 100 automatically reactivates. In some embodiments, the disable switch 163 is a spring wound timer that responds to a twist motion. While the spring wound timer is active (e.g., ticking down), the pest deterrent system 100 is disabled and the sensor module 102 does not sent an actuation signal to the first actuator module 104. When the spring wound timer is inactive (e.g., at zero), the pest deterrent system 100 is active.

Figure 4:
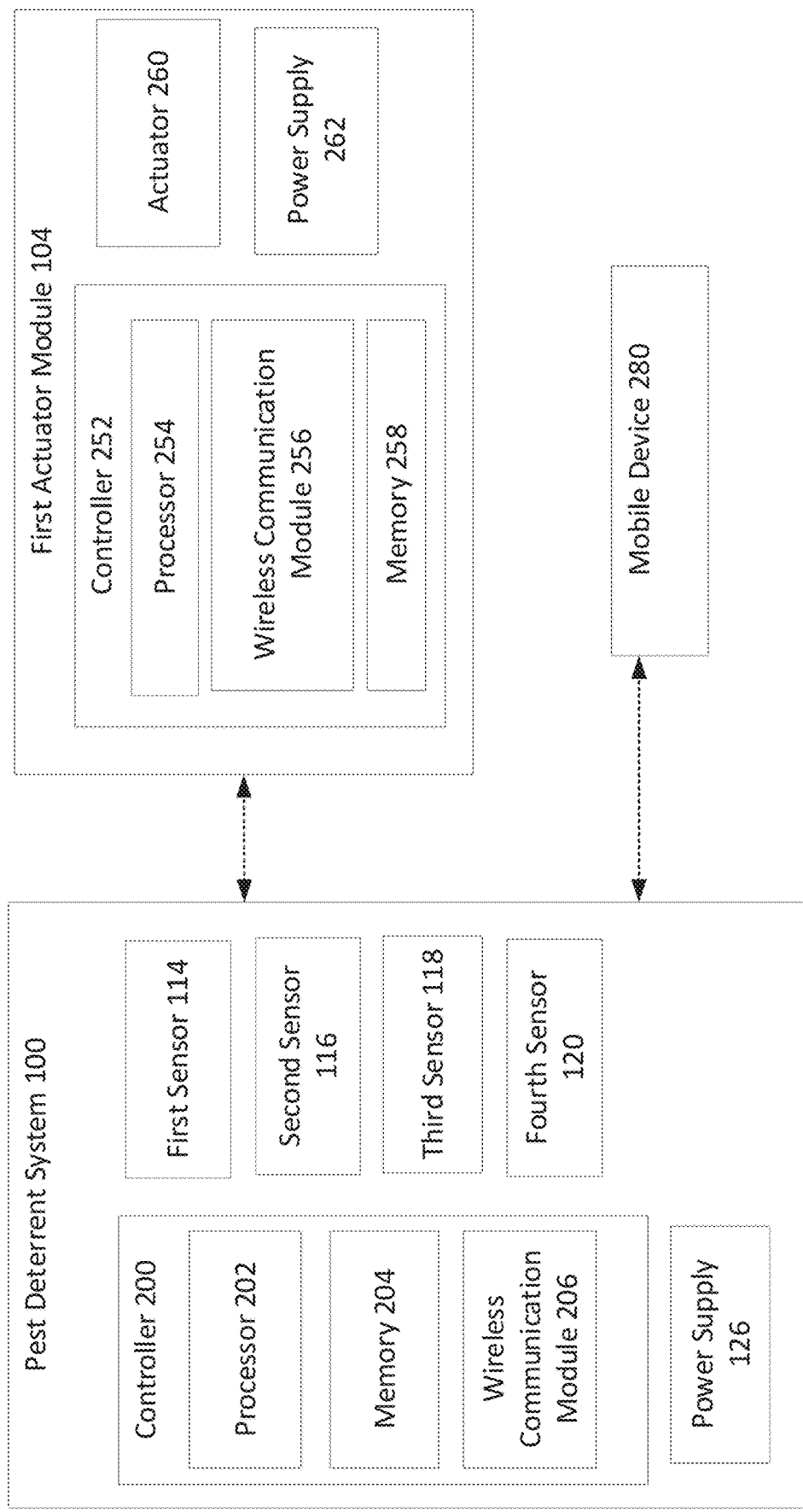
FIG. 4 is a schematic of the pest deterrent device of FIG. 1.
Figure 5:
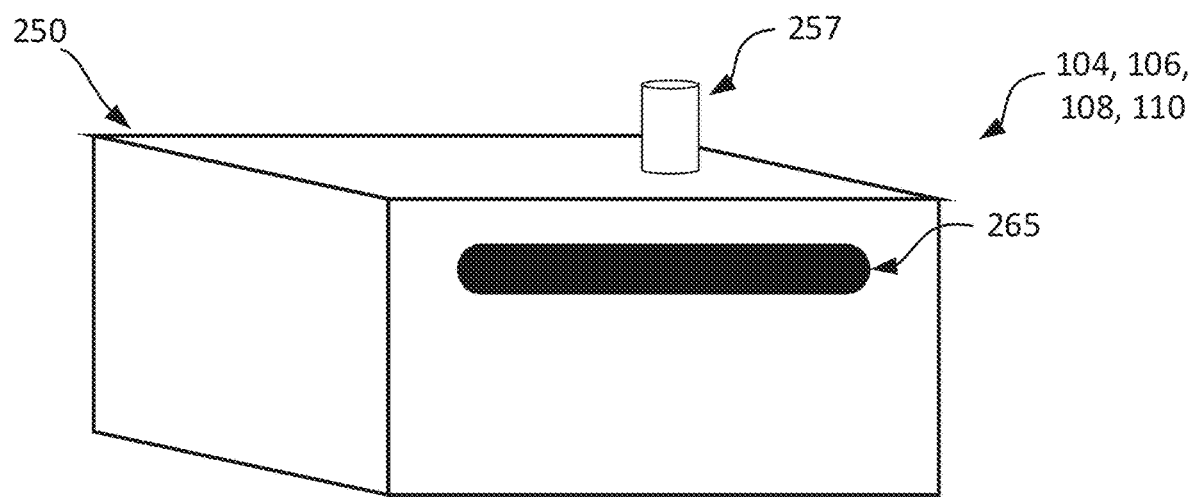
FIG. 5 is a perspective view of an actuator module of the pest deterrent device of FIG. 1.

FIG. 4 is a schematic diagram of a first controller 200 of the pest deterrent system 100, according to an example embodiment. The first controller 200 is positioned within the housing 130 of the sensor module 102. The first controller 200 is operatively coupled to the first sensor 114, the second sensor 116, the third sensor 118, and the fourth sensor 120. The first controller 200 includes a processor 202, a memory 204, and a wireless communication module 206. The memory 204 may store machine-executable instructions that, when executed by the processor 202, cause the processor 202 to perform one or more of computer operations. The processor 202 may include one or more microprocessors, application specific integrated circuits (ASICs), field programmable gate arrays (FPGAs), other forms of processing circuits, or combinations thereof. The memory 204 may include, but is not limited to, electronic, optical, magnetic, or any other storage or transmission device capable of providing the processor 202 with program instructions. The memory 204 may include storage devices such as a floppy disk, CD-ROM, DVD, magnetic disk, memory chip, ROM, RAM, EEPROM, EPROM, flash memory, optical media, or any other suitable memory from which the processor 202 can read instructions and/or data. The processor 202 and the memory 204 may form a processing module.

The processor 202 originates and/or transmits traffic via the wireless communication module 206. The term "traffic", as in "network traffic", generally refers to data communications between the processor 202 and a remote wireless device, such as a mobile device 280. In some embodiments, the wireless communication module 206 is in communication with other networks, including but not limited to the internet. In some embodiments, the operation radius 103 is defined by and determined by the processor 202.

The sensor module 102 includes a power supply 126. In some embodiments, the power supply 126 is a solar panel. In some embodiments, the power supply 126 is a rechargeable battery.

In response to a triggering event, such as the detection of an animal, the first sensor 114 sends an alert (e.g., signal) to the processor 202 to indicate that the first sensor 114 has been triggered. In some embodiments, such as when the first sensor 114 is a proximity sensor or an occupancy sensor, the first sensor 114 sends a binary signal that only indicates that the first sensor 114 has been triggered. For example, when a rat is positioned in front of the first sensor 114, the first sensor 114 sends an alert to the first controller 200 to actuate one of the actuator modules 104. However, the first sensor 114 may not be configured to measure other data about the rat, such as speed, distance, size, and the like. The first controller 200 may record the triggering event in a record stored in the memory 204. A record entry to the record may include a time stamp of the triggering event.

In some embodiments, such as when the first sensor 114 is a distance sensor, the first sensor 114 may send a signal to the processor 202 indicating a distance of the object from the sensor module 102. For example, a rat may travel along a path toward the sensor module 102. When the rat enters the field of view of the first sensor 114, the first sensor 114 may send an alert to the first controller 200 that includes a distance measurement. The first controller 200 may then save the triggering event to the record in the memory 204, the record entry including a time stamp and a distance. As the rat moves closer to the sensor module 102, the first sensor 114 may be triggered again and send another alert to the controller. The alert may be saved to the record in the memory 204. The first controller 200 may be configured to export the record to a device separate from the pest deterrent system 100, such as the mobile device 280 of the user. For example, the wireless communication module 206 may transmit the record to the mobile device 280 of the user, such as using Bluetooth or a similar low-power and/or short range signal.

In some embodiments, the mobile device 280 may send control signals to the first controller 200. For example, similar to the control panel 160, the mobile device 280 may include buttons or switches, either physical or displayed on an interface of the mobile device 280, that allows the user to control the pest deterrent system 100 remotely. For example, the mobile device 280 may include the disable switch 163 displayed virtually on the interface such that a user may engage with the disable switch 163 to disable the pest deterrent system 100. In some embodiments, the control panel 160 is configured to be programmed via the mobile device 280. For example, the mobile device 280 may send a disable duration to the first controller 200 such that the pest deterrent system 100 is disabled for the disable duration when the disable switch 163 on the control panel 160 is actuated. In other words, the mobile device 280 sets the disable duration for the disable switch 163.

In some embodiments, a triggering event may trigger the first sensor 114 and the second sensor 116 such that both the first sensor 114 and the second sensor 116 send distance data to the processor 202, and the processor 202 is configured to calculate a distance and position of the object based on the data received from the first sensor 114 and the second sensor 116. For example, a rat may be traveling along a path toward the corner between the first sensor 114 and the second sensor 116. Both the first sensor 114 and the second sensor 116 may be triggered and send an alert to the first controller 200 at the same time. The first controller 200 then adds both alerts to the record with a similar time stamp.

In some embodiments, the first sensor 114 includes multiple sensors positioned on the same side of the housing 130. For example, the first sensor 114 may include two distance sensors positioned apart by a known distance on a planar sidewall (e.g., the first sidewall 138) of the housing 130. The cooperative data received from the plurality of sensors of the first sensor 114 may allow the processor 202 to determine a distance of the object from the first sidewall 138, similar to how a 3D camera and the human eyes function.

Following a triggering event, and in real time, the processor 202 sends a signal to one of the actuator modules to complete a task. In some embodiments, the actuator modules 104, 106, 108, 110 are operatively coupled to the sensor module 102 via wires. In some embodiments, the actuator modules are controllable by a wireless connection (FIG. 2).

In some embodiments, the pest deterrent system 100 may also be configured to detect and determine a direction a pest is travelling and actuate the first actuator module 104 or a plurality of the actuator modules 104, 106, 108, 110 depending on which direction the pest is traveling. For example, multiple sensors 114, 116, 118, 120 may be triggered in a particular order that may indicate to the sensor module 102 that the pest is travelling in a particular direction (e.g., left-to-right, right-to-left, clockwise, counterclockwise, back-and-forth, etc.). Accordingly, based on a determined direction of the pest, the sensor module 102 may trigger the actuator modules 104, 106, 108, 110 in a particular order. In some embodiments, the sensor module 102 actuates the actuator module that is in the determined path of the pest. For example, referring to FIG. 1, a pest may pass by the sensor module 102 such that the second sensor 116 is triggered and then the first sensor 114 is triggered shortly thereafter (e.g., within seconds, within a second, etc.). Based on the order that the first sensor 114 and the second sensor 116 are triggered, the sensor module 102 determines that the pest is traveling up and to the left relative to the orientation of FIG. 1 (e.g., counterclockwise about the sensor module 102). Based on determining a path of the pest, the sensor module 102 may send a signal to the first actuator module 104 to actuate because the first actuator module 104 is along (e.g., substantially along, near, etc.) the determined path of the pest. If the pest turns right and away from the sensor module 102, then the sensor module 102 will have completed the task of deterring the pest from the garden. If the pest turns left and continues the counterclockwise path about the sensor module 102, then the fourth sensor 120 may be triggered by the pest. In response to detecting that, in order, the second sensor 116, then the first sensor 114, then the fourth sensor 120 were triggered, then the sensor module 102 is configured to determine a path of the pest is counterclockwise about the sensor module 102. The sensor module 102 then triggers the fourth actuator module 110 to actuate in response to detecting that the pest triggered the fourth sensor 120 after having triggered, in order, both the second sensor 116 and the first sensor 114.

In some embodiments, the sensor module 102 actuates the actuator module 104, 106, 108, 110 that is positioned in the opposite direction to the determined path of the pest. For example, if the third sensor 118 is triggered, followed by the fourth sensor 120, the sensor module 102 may determine that the pest is moving along a path clockwise about the sensor module 102. The sensor module 102 may send a signal to actuate the fourth actuator module 110, which is positioned in an opposite direction to the determined path of the pest.

When the pest changes directions based on the perceived threat straight behind, the new determined direction of the pest may cause the sensor module to trigger another actuator positioned behind the pest. For example, if the next sensor to be triggered is the first sensor 114, the sensor module 102 may send a signal to actuate the first actuator module 104. As this continues, the pest may be confused and/or so scared that the pest avoids the garden entirely in the future. The first controller 200 may then save the triggering events of the third sensor 118 and the fourth sensor 120 to the record in the memory 204, the record entry including a determined path that the pest traveled. If the same sensors are triggered over and over in the same order (e.g., the third sensor 118 followed by the fourth sensor 120), then the sensor module 102 may determine that if the third sensor 118 is triggered first (e.g., before another sensor is triggered), then the pest is headed counterclockwise about the sensor module 102. In some embodiments, the sensor module 102 may send a signal to actuate the third actuator module 108 with a high certainty that the third actuator module 108 is positioned in the opposite direction that the pest is headed. In some embodiments, the sensor module 102 is configured to learn the routes of pests depending on which sensor of the sensors 114, 116, 118, 120 is triggered first.

Figure 6:
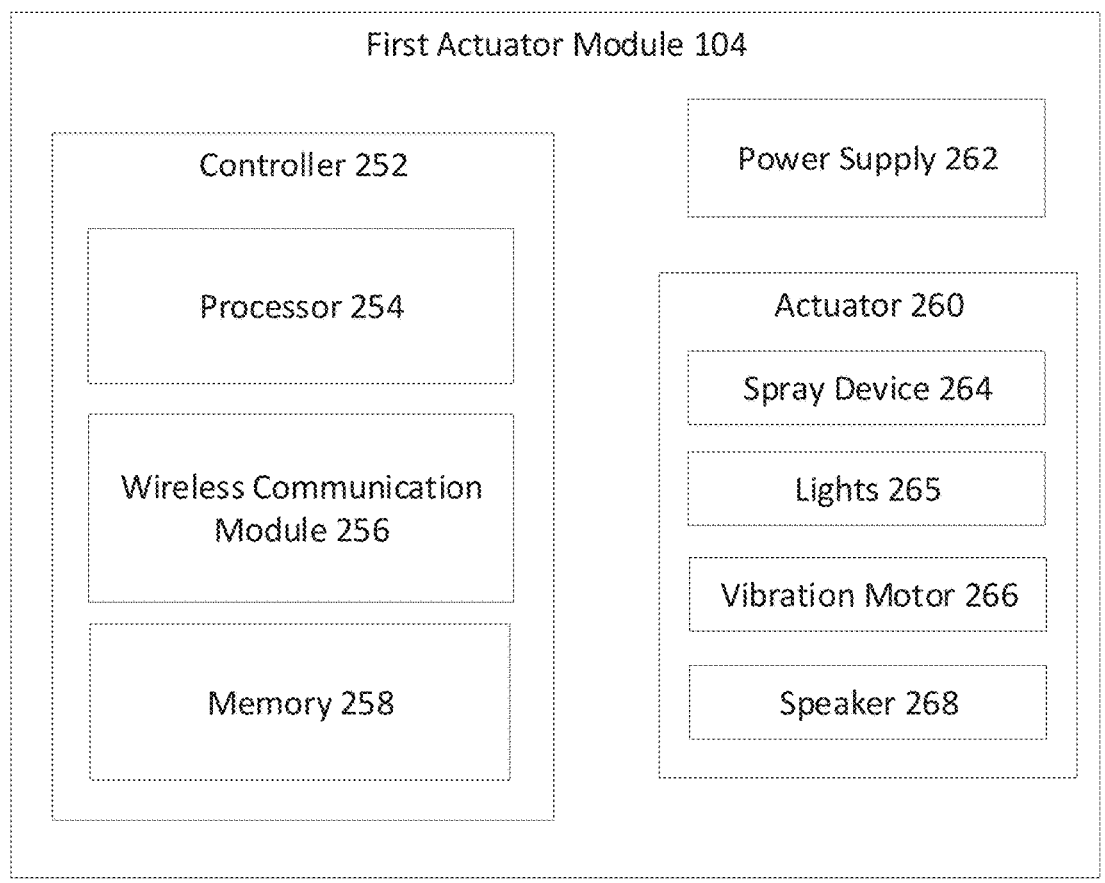
FIG. 6 is a schematic of the actuator module of FIG. 5.
Figure 7:
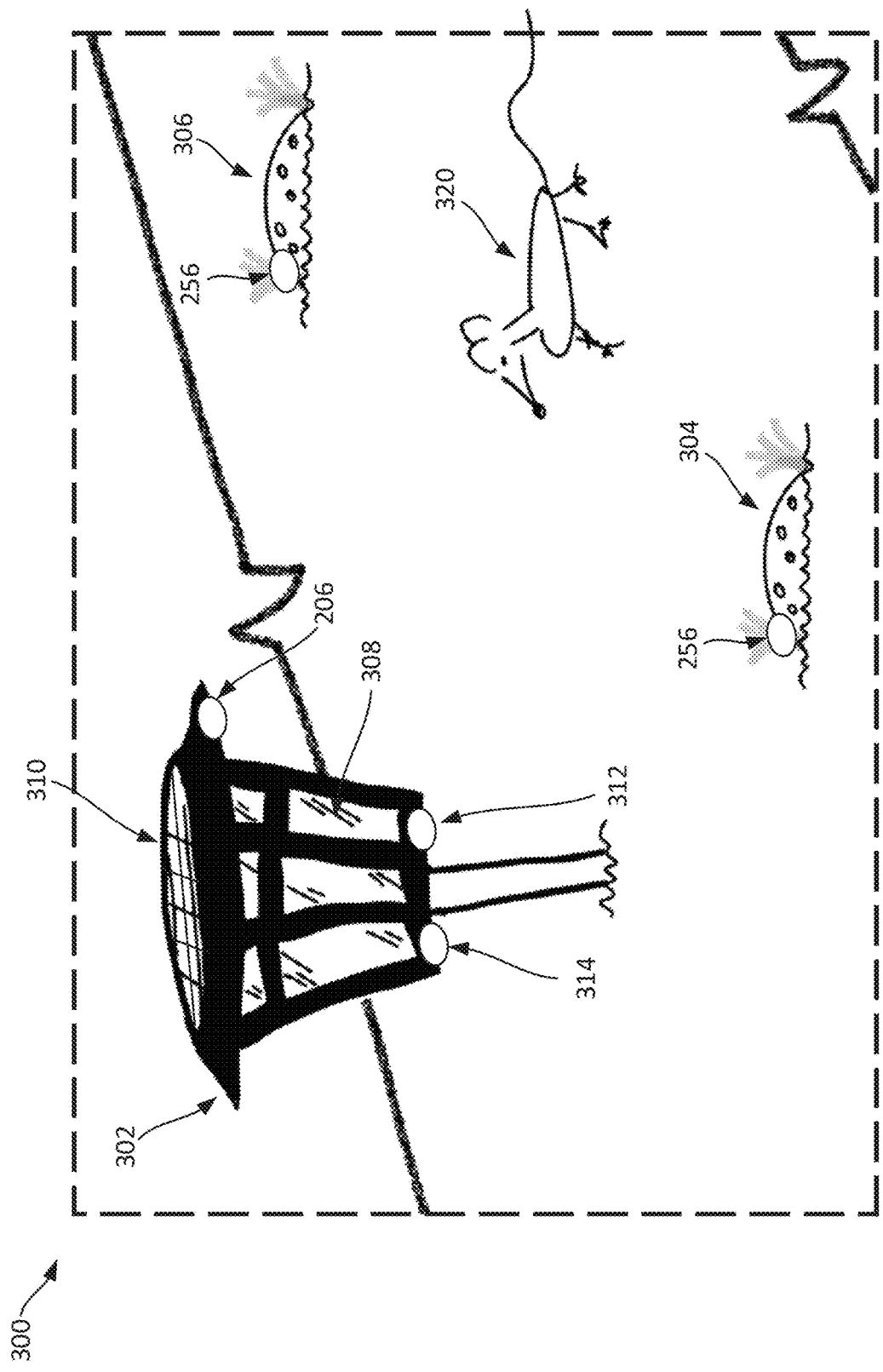
FIG. 7 is a perspective view of a pest deterrent device in a garden, according to yet another example embodiment.

As shown in FIG. 6, the first actuator module 104 includes a housing 250 separate from the housing 130. The housing 250 is fluidly isolated from the housing 130 and is configured to be positioned apart from the housing 130 and within the operation radius 103. The housing 250 is formed of a corrosion resistant material, such as plastic, stainless steel, aluminum, and the like. The housing 250 may have most any three-dimensional shape, such as a puck, ball, bean, pill, box, lobe, and the like. In some embodiments, the housing 250 takes the shape of an item commonly found outside and/or in a garden. For example, first actuator module 104 may take the shape of a rock, stick, brick, garden decoration (e.g., gnome), lamp, birdbath, and so on. The housing 250 may be opened to expose the inside of the housing 250 such that repairs and modifications may be made. The housing 250 is waterproof and/or weatherproof such that the first actuator module 104 may spend extended periods of time outside and/or underground. Positioned within the housing 250 is a controller 252 (FIG. 7) including a processor 254, a wireless communication module 256, and a memory 258. The memory 204 may store machine-executable instructions that, when executed by the processor 202, cause the processor 202 to perform one or more of computer operations. The wireless communication module 256 may receive a signal from the sensor module 102 to complete a task.

The first actuator module 104 further includes an actuator 260 (e.g., scare actuator) operatively coupled to the housing 250 and a power supply 262 operatively coupled to the controller 252 and the actuator 260. In some embodiments, the actuator 260 is waterproof and positioned outside of the housing 250. In some embodiments, the actuator 260 is positioned within the housing 250. The actuator 260 may be a vibration motor 266, a speaker 268, a spray device 264, a water pump, lights 265, and the like. When the wireless communication module 256 receives a signal from the sensor module 102, the processor 254 causes the actuator 260 to actuate. For example, if the actuator 260 is the vibration motor 266, the vibration motor 266 may actuate, sending vibrations through the ground and scaring away the garden pest. In some embodiments, the actuator 260 is the speaker 268 and sends a loud sound that spooks the garden pest. In some embodiments, the actuator 260 is the spray device 264 configured to provide a mist, such as pheromones, pepper spray, garlic, onion, ammonia, peppermint oil, citronella oil, and the like. The spray device 264 may include a nozzle 257 extending away from the housing 250 and configured to provide a spray from the spray device 264. In some embodiments, the actuator 260 launches a projectile, such as salt or sand, from the nozzle 257 to spook the garden pest. In some embodiments, the actuator 260 flashes the lights 265.

In some embodiments, the processor 202 is configured to determine which actuator module 104, 106, 108, 110 to actuate based on which sensor 114, 116, 118, 120 is triggered. For example, referring to FIG. 1, if an object is traveling proximate to the second sensor 116, the second sensor 116 may be triggered and send an alert to the processor 202. In response to receiving the alert, the processor 202 may actuate the first actuator module 104. In some embodiments, the processor 202 may actuate the first actuator module 104 and the second actuator module 106.

In some embodiments, the processor 202 may randomize which actuator module 104, 106, 108, 110 is actuated in response to which sensor is triggered. For example, if the third sensor 118 is frequently triggered and the same actuator module, such as the third actuator module 108, is actuated each time, the garden pest may eventually learn that there is no threat. Thus, the processor 202 may randomly actuate one of the actuator modules in response to each triggering event. For example, in response to a first triggering event, the processor 202 triggers the fourth actuator module 110. In response to a second triggering event following the first triggering event, the processor 202 may actuate both the third actuator module 108 and the first actuator module 104 at the same time.

In some embodiments, the actuator 260 includes multiple actuators. The actuator 260 may include the vibration motor 266 and the lights 265. In response to a triggering event, the processor 202 may send a signal to the first actuator module 104 to actuate one of or both of the vibration motor 266 and the lights 265. In some embodiments, each of the actuator modules 104, 106, 108, 110 include the vibration motor 266 and the spray device 264. The processor 202 may then randomize which of the actuator modules 104, 106, 108, 110 to actuate and which actuator 260 to actuate. For example, in response to a first triggering event, the processor 202 may actuate the vibration motor 266 of the first actuator module 104 and the spray device 264 of the third actuator module 108. In response to a second triggering event, the processor 202 may actuate the vibration motor 266 of the second actuator module 106 and the spray device 264 of the first actuator module 104.

Figure 8:
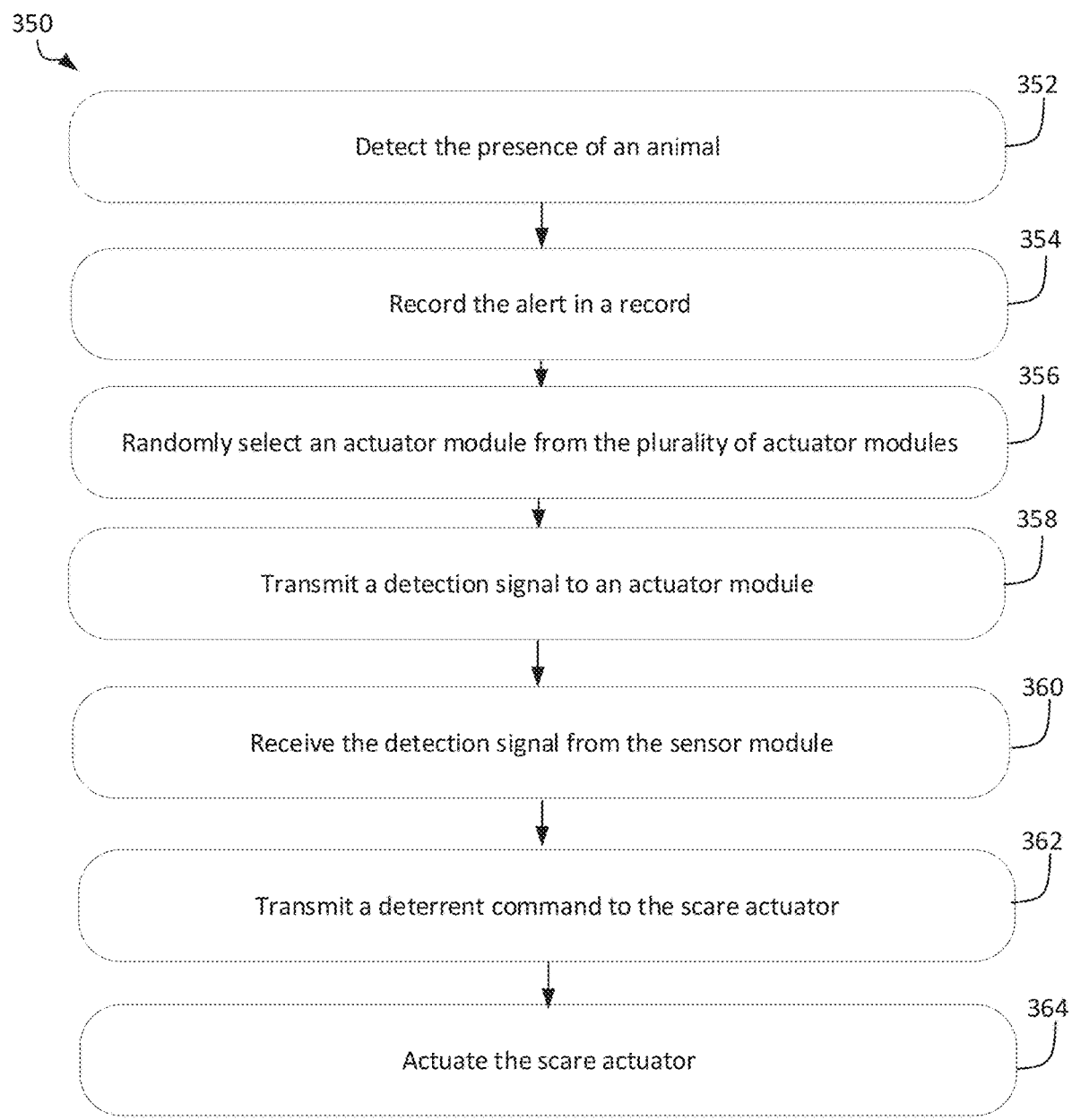
FIG. 8 is a diagram of a method of deterring a pest, according to an example embodiment.

Referring now to FIG. 8, a pest deterrent system 300 is provided according to an example embodiment. The pest deterrent system 100 is similar to the pest deterrent system 300. Accordingly, like numbering is used to denote like parts between the pest deterrent system 300 and the pest deterrent system 100. The pest deterrent system 300 includes a sensor module 302, a first peripheral actuator module 304, and a second peripheral actuator module 306. The sensor module 302 is shaped like a lamp having a light 308 and a solar panel 310 positioned on top of the lamp and configured to power the sensor module 302. While the sensor module 302 is shown as having the form of a lamp, if should be understood that the sensor module 302 may be integrated into a different garden feature, such as a birdbath, bench, decorative rock, and the like.

The sensor module 102 includes a first sensor 312 and a second sensor 314. The first sensor 312 and the second sensor 314 may be infrared sensors, ultrasonic sensors, position sensors, proximity sensors, motion sensors, or similar sensors. The first sensor 312 and the second sensor 314 are configured to detect the presence of an object, such as an animal. In some embodiments, the first sensor 312 and the second sensor 314 are infrared cameras and are configured to detect the heat emitted from a warm-blooded animal 320, such as a squirrel or rabbit. In some embodiments, the first sensor 312 and the second sensor 314 are video cameras.

The first sensor 312 and the second sensor 314 are coupled to an underside of the sensor module 302 to limit the visual range of the sensors 312, 314.

The first peripheral actuator module 304 and the second peripheral actuator module 306 are configured to be buried or partially buried in the ground away from the sensor module 302. Similar to the first actuator module 104, the first peripheral actuator module 304 and the second peripheral actuator module 306 include the controller 252, the processor 254, the wireless communication module 256, the memory 258, the actuator 260, and the power supply 262. The first peripheral actuator module 304 and the second peripheral actuator module 306 may take the form a rock, stick, plant, or other object commonly found outside or in a garden. In some embodiments, the first peripheral actuator module 304 and the second peripheral actuator module 306 receive controls from the sensor module 302 to vibrate, make sound, emit a spray, or launch a projectile.

Referring now to FIG. 8, a method 350 of deterring pests using the pest deterrent system 100 is shown, according to an example embodiment. At 352, the sensor module 102 detects the presence of a pest, such as an animal or human. The sensor module 102 may detect the presence of the pest using a sensor, such as the first sensor 114. The first sensor 114 may be a passive infrared sensor configured to detect the radiant heat of a warm body. In some embodiments, the sensor is a proximity sensor that detects that something, such as a pest, has passed in front of the first sensor 114. In some embodiments, the first sensor 114 is a pressure sensor configured to detect the presence of the pest based on the mass (e.g., weight) of the pest.

At 354, the first controller 200 of the sensor module 102 records the detection of the pest in a record stored in the memory 204. The record may include a time stamp, distance, an indication of which sensor detected the pest, a mass, a speed, and a velocity. The record is formatted such that the first controller 200 may transmit the record to the mobile device 280 of the user. For example, the record may include structured data.

At 356, the sensor module 102 may randomly select one of the actuator modules 104. In some embodiments, the sensor module 102 selects two or more of the actuator modules 104. This prevents the pest from learning and predicting where the vibration, sound, light, noise, and/or smell is coming from.

At 358, the wireless communication module 206 of the first controller 200 transmits the detection signal to the actuator module 104 selected at 356.

At 360, the actuator module 104 receives the detection signal from the sensor module 102.

At 362, the controller 252 of the actuator module 104 transmits a deterrent command to the actuator module 104.

At 364, the actuator 260 actuates.

Figure 9:
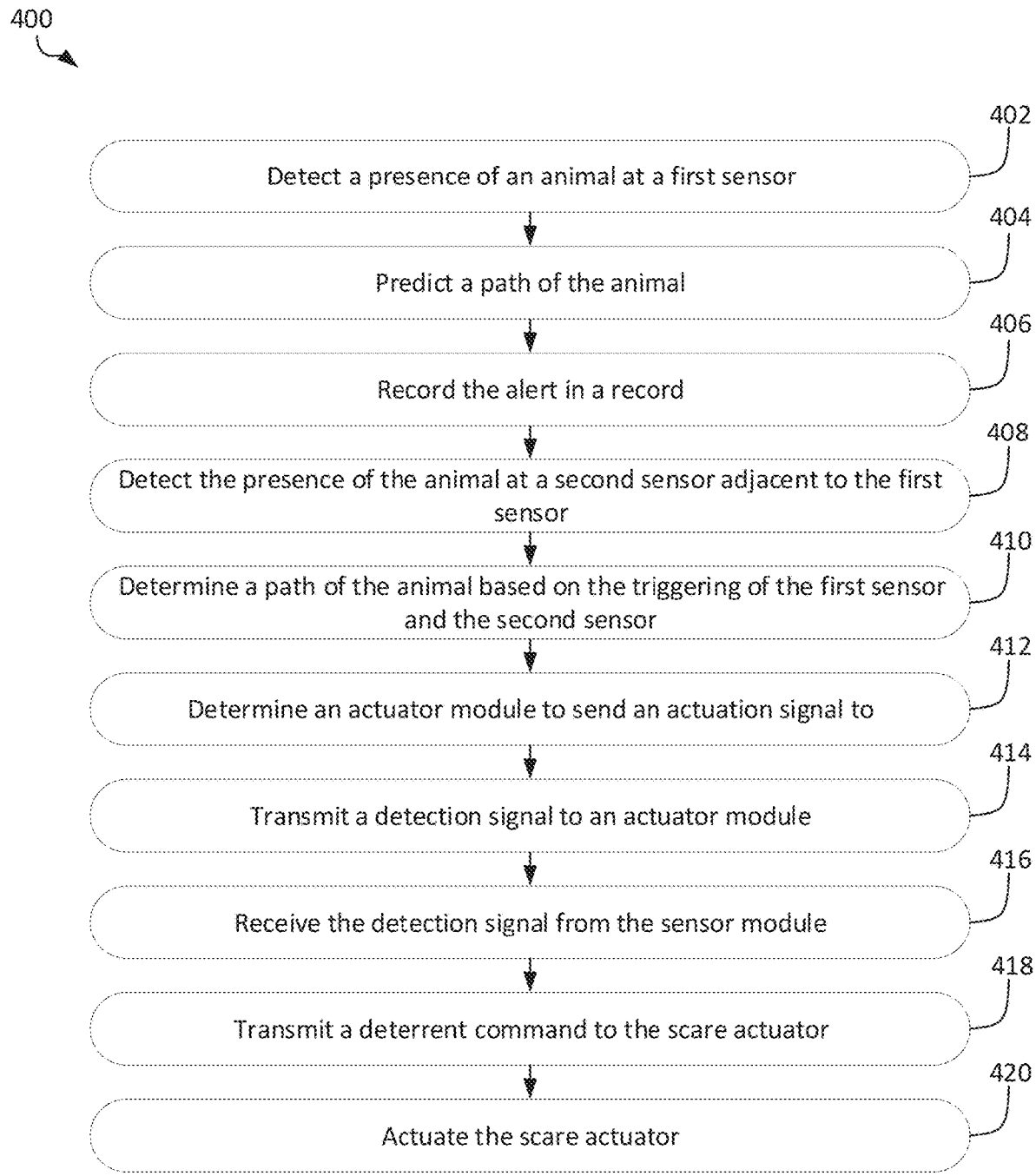
FIG. 9 is a diagram of a method of deterring a pest, according to an example embodiment.

Referring now to FIG. 9, a method 400 of deterring pests using the pest deterrent system 100 is shown, according to an example embodiment. At 402, the sensor module 102 detects the presence of a pest, such as an animal or human, at a first sensor. The first sensor may be the third sensor 118. The third sensor 118 may be a passive infrared sensor configured to detect the radiant heat of a warm body. In some embodiments, the third sensor 118 is a proximity sensor that detects that something, such as a pest, has passed in front of the third sensor 118.

At 404, the sensor module 102 makes a predication as to the direction the pest is traveling. For example, after multiple triggering events, the sensor module 102 may determine with 80% certainty (e.g., predict) that when the second sensor 116 is triggered, the pest is traveling in a direction counterclockwise about the sensor module 102. In some embodiments, the sensor module 102 is configured to collected a threshold amount of data before being configured to make predictions. For example, the sensor module 102 may be configured to collect a record for 40 triggering events before switching from a "learning" mode to a "prediction" mode. The mobile device 280 may include a toggle that allows the user to manually switch the sensor module 102 between the "learning" mode and the "prediction" mode. When the pest deterrent system 100 is in the "learning" mode, step 404 is skipped.

At 406, the first controller 200 of the sensor module 102 records the detection of the pest in a record stored in the memory 204. The record may include a time stamp, distance, an indication of which sensor detected the pest, a predicted path, a mass, a speed, and a velocity. The record is formatted such that the first controller 200 may transmit the record to the mobile device 280 of the user. For example, the record may include structured data.

At 408, the sensor module 102 detects the presence of the pest from step 402 at a second sensor different from the first sensor of step 402. In some embodiments, the second sensor is the sensor nearest to (e.g., adjacent to, proximate to, etc.) the first sensor. For example, if the first sensor is the third sensor 118, then the second sensor may be either of the second sensor 116 or the fourth sensor 120. In some embodiments, the first sensor and the second sensor are positioned on the same side of the sensor module 102 and separated by a distance.

At 410, the sensor module 102 determines a path of the pest in response to the triggering of both the first sensor and the second sensor. When the pest deterrent system is in the "learning" mode, the sensor module 102 determines a path of the pest based on the triggering of the first sensor an the second sensor, the path being a determined path. When the pest deterrent system 100 is in "predict" mode, the sensor module 102 predicts a path of the pest based only on the triggering of the first sensor (the path is determined and action is taken before the second sensor is triggered), the path being a predicted path. Regardless of whether the system is in the "learning" mode or the "predicting" mode, the first controller 200 records the detection of the pest from both the first sensor and the second sensor in a record stored in the memory 204

At 412, the sensor module 102 selects one of the actuator modules 104 to actuate. In some embodiments, the sensor module 102 selects the actuator module 104 that is positioned along or proximate to the path (e.g., predicted path from step 404, determined path from step 410) of the pest. In some embodiments, the sensor module 102 selects the actuator module 104 that is positioned behind (e.g., in substantially the opposite direction of) the path of the pest. As will be appreciated, a single pest may cause multiple triggering events of the sensor module 102 as the pest travels about the garden. In some embodiments, the sensor module 102 alternates (e.g., randomly alternates) between triggering the actuator module 104 either in front of or behind the pest to confuse the pest.

At 414, the wireless communication module 206 of the first controller 200 transmits the detection signal to the actuator module 104 selected at 412.

At 416, the actuator module 104 receives the detection signal from the sensor module 102.

At 418, the controller 252 of the actuator module 104 transmits a deterrent command to the actuator module 104.

At 420, the actuator 260 actuates.

The time elapsed to complete all of steps 402-420 is approximately zero seconds (e.g., nearer to 0 seconds than to 1 second). In some embodiments, the sensor module 102 includes a time delay to prevent the overloading of data to the record within the memory 604. For example, after one of the sensors 114, 116, 118, 120 has been triggered, the sensor module 102 may be set to wait a predetermined amount of time (e.g., 200 milliseconds, 0.5 seconds, 3 seconds, etc.) before responding to another triggering event and recording the triggering event in the record of the memory 204.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:
1. A pest deterrent system comprising:
a sensor module configured to be positioned at a first location, the sensor module defining an operation radius, the sensor module comprising:
a first housing having a view window positioned in a sidewall of the first housing;
a sensor configured to detect a presence of a pest at the first location, the sensor positioned within the first housing and proximate to the view window, the sensor in visual communication with the view window and facing out of the first housing; and a first controller positioned within the first housing and operatively coupled to the sensor, the first controller configured to receive a signal from the sensor, the signal indicating the presence of the pest; and
an actuator module operatively coupled to the sensor module and configured to be positioned within the operation radius, the actuator module comprising:
a second housing separate from the first housing of the sensor module;
an actuator positioned within the second housing, the actuator configured to generate a deterrent stimulus at a second location when actuated, the second location being different from the first location; and
a second controller configured to receive the signal from the first controller and actuate the actuator.

2. The assembly of claim 1, wherein the sensor is a passive infrared sensor configured to detect radiant heat from a warm body.

3. The assembly of claim 1, wherein the first housing and the second housing are weatherproof, the first housing being fluidly isolated from the second housing.

4. The assembly of claim 1, further comprising a control panel operatively coupled to the sensor module and communicatively coupled to the first controller, the control panel including a disable switch configured to disable at least one of the sensor module or the actuator module when actuated.

5. The assembly of claim 1, wherein the first controller further comprises a wireless module configured to send an alert to a wireless device of a user when the sensor detects the presence of the pest.

6. The assembly of claim 1, further comprising a snap-on lens removably coupled to the housing in visual communication with the view window, the snap-on lens configured to adjust a focal length of the sensor.

7. The assembly of claim 1, wherein the first housing and the second housing are separated such that the second housing is independently positionable relative to the first housing.

8. The assembly of claim 1, wherein the sensor module does not send the signal to the actuator module when the actuator module is positioned outside of the operation radius.

9. A pest deterrent system comprising:
a control hub defining an operation radius, the control hub comprising:
a sensor housing;
a first sensor and a second sensor positioned within the sensor housing, the first sensor and the second sensor configured to:
detect a presence of an animal within a detected area within the operation radius; and
in response to detecting the presence of the animal, transmit a detection signal;
a first controller communicably coupled to the first sensor and the second sensor, the first controller configured to:
receive the detection signal from the first sensor and the second sensor;
in response to receiving the detection signal, select at least one peripheral module of a plurality of peripheral modules to actuate within a deterrence area, the deterrence area being different from the detected area; and
in response to receiving the detection signal, transmit a deterrent request to the least one peripheral module; and the plurality of peripheral modules in communication with the control hub and configured to be positioned within the operation radius, each peripheral module in the plurality of peripheral modules comprising:
an actuator housing separate from the sensor housing;
an actuator positioned within the actuator housing; and
an actuator controller in communication with the first controller, the actuator controller configured to:
receive the deterrent request from the first controller; and
in response to the receiving the deterrent request, transmit a deterrent command to the actuator so as to cause the actuator to actuate and generate a deterrent stimuli.

10. The system of claim 9, wherein at least of the first sensor or the second sensor is a passive infrared occupancy sensor configured to detect radiant heat emitted by the animal.

11. The system of claim 9, wherein the actuator is a vibration motor configured to vibrate the actuator housing when actuated.

12. The system of claim 9, wherein the sensor housing and the actuator housing are weatherproof, the sensor housing being fluidly isolated from the actuator housing.

13. The system of claim 9, wherein the sensor housing is entirely separated from the actuator housing such that the sensor housing and the actuator housing are independently positionable relative to one another.

14. The system of claim 9, wherein the the plurality of peripheral modules is configured to receive signals from the sensor module at all positions within the operation radius.

15. The system of claim 14, wherein the operation radius is greater than 6 inches.

16. A method comprising:
detecting, by a sensor of a sensor module, a presence of an animal at a first location within an operation radius defined by the sensor module;
transmitting, by the sensor module to an actuator module positioned separate from the sensor module within the operation radius, a detection signal in response to the detecting the presence of the animal;
receiving, by the actuator module from the sensor module, the detection signal;
transmitting, by the actuator module to an actuator, a deterrent command in response to receiving the detection signal so as to actuate the actuator; and
generating, by the actuator, a deterrent stimuli at a second location, the second location different from the first location.

17. The method of claim 16, wherein the actuator module is independently positionable relative to the sensor module within the operation radius.

18. The method of claim 16, wherein the actuator is a first actuator of a plurality of actuators, the method further comprising:
randomly selecting, by the sensor module, a actuator from the plurality of actuators;
transmitting, by the actuator to the second actuator, a second deterrent command so as to actuate the second actuator; and
generating, by the second actuator, a deterrent stimuli at a third location different from the first location and the second location.

19. The method of claim 16, wherein the actuator is a vibration motor.

20. The method of claim 16, wherein:
the sensor module includes a passive infrared sensor; and the detecting the presence of an animal further comprises detecting radiant heat from the animal with the passive infrared sensor.

\* \* \* \* \*